United States Patent [19]

Shimura

[11] Patent Number: 4,947,043

[45] Date of Patent: Aug. 7, 1990

[54] RADIATION IMAGE RECORDING AND READ-OUT APPARATUS

[75] Inventor: Kazuo Shimura, Kanagawa, Japan

[73] Assignee: Fuji Photo Film Co., Ltd., Kanagawa, Japan

[21] Appl. No.: 248,748

[22] Filed: Sep. 26, 1988

[30] Foreign Application Priority Data

Sep. 25, 1987 [JP] Japan .................. 62-241395

[51] Int. Cl.$^5$ .............................. G03B 42/08
[52] U.S. Cl. .................. 250/327.2; 250/484.1
[58] Field of Search ............... 250/327.2 K, 484.1 B

[56] References Cited

U.S. PATENT DOCUMENTS

| | | | |
|---|---|---|---|
| 1,724,572 | 8/1929 | Geisen | 250/329 |
| 3,444,372 | 5/1969 | De Hart | 250/483.1 |
| 4,543,479 | 9/1985 | Kato | 250/327.2 |
| 4,687,932 | 8/1987 | Tamura et al. | 250/327.2 |

FOREIGN PATENT DOCUMENTS 0209119 1/1987 European Pat. Off. ..... 250/327.2 F

*Primary Examiner*—Constantine Hannaher
*Attorney, Agent, or Firm*—Sughrue, Mion, Zinn, Macpeak & Seas

[57] ABSTRACT

A radiation image recording and read-out apparatus comprises an endless belt provided with a stimulable phosphor layer, a conveyance system for conveying the endless belt, an image recording section facing the endless belt for exposing the stimulable phosphor layer to radiation carrying an image to have the radiation image stored thereon, and an image read-out section facing the endless belt for irradiating stimulating rays to the image-recorded stimulable phosphor layer and obtaining electric image signals by detecting light emitted by the stimulable phosphor layer in proportion to the stored radiation energy when the stimulable phosphor layer is exposed to the stimulating rays. An erasing section faces the endless belt for eliminating residual radiation energy on the stimulable phosphor layer. The conveyance system is provided with adjustment section at least at two positions for variably adjusting a length of conveyance of the endless belt.

4 Claims, 5 Drawing Sheets

RADIATION IMAGE RECORDING AND READ-OUT APPARATUS

BACKGROUND OF THE INVENTION

1. Field of the Invention

This invention relates to a radiation image recording and read-out apparatus for recording a radiation image on a stimulable phosphor, exposing the stimulable phosphor to stimulating rays which cause the stimulable phosphor to emit light in proportion to the stored radiation energy, detecting the emitted light to read out the radiation image, and converting the emitted light into electric signals. This invention particularly relates to a radiation image recording and read-out apparatus which efficiently carries out image recording, image read-out and other processing.

2. Description of the Prior Art

When certain kinds of phosphors are exposed to a radiation such as X-rays, α-rays β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a recording material provided with a layer of the stimulable phosphor is first exposed to a radiation passing through an object such as the human body to have a radiation image of the object stored thereon, and is then two-dimensionally scanned by stimulating rays such as a laser beam which cause the recording material to emit light in proportion to the stored radiation energy. The light emitted by the recording material upon stimulation thereof is photoelectrically detected and converted to electric image signals by a photodetector, and the radiation image of the object is reproduced as a visible image by use of the image signals on a recording medium such as a photographic film, a display device such as a cathode ray tube (CRT), or the like.

The radiation image recording and reproducing system using a recording material provided with a stimulable phosphor is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a wide range is proportion to the amount of said stored energy, it is possible to obtain an image having desirable density regardless of the amount of exposure of the recording material provided with the stimulable phosphor to the radiation, by reading out the emitted light with an appropriate read-out gain and converting it into electric signals to reproduce a visible image on a recording medium or a display device.

In the aforesaid radiation image recording and reproducing system, the recording material provided with the stimulable phosphor is used to temporarily store the radiation image in order to reproduce the final visible image therefrom on a final recording medium. For economical reasons, therefore, it is desirable that the recording material provided with the stimulable phosphor be used repeatedly.

Accordingly, the applicant proposed in, for example, Japanese Unexamined Patent Publication No. 58(1983)-200269, a radiation image recording and read-out apparatus which enables efficient circulation and reuse of the stimulable phosphor.

The proposed radiation image recording and read-out apparatus comprises, built in a single apparatus:

(a) a supporting material, (b) at least one recording material fixed on said supporting material and comprised of a stimulable phosphor layer capable of storing a radiation image, (c) an image recording section for exposing said recording material to a radiation passing through an object to have a radiation image of the object stored on said recording material, (d) an image read-out section provided with a stimulating ray irradiation means for irradiating stimulating rays to said recording material carrying said radiation image stored thereon, and a photoelectric read-out means for obtaining electric image signals by reading out light emitted by said recording material in proportion to the stored radiation energy when said recording material is exposed to the stimulating rays, (e) a means for circulating said recording material on said supporting material with respect to said image read-out section for enabling reuse of said recording material by repeatedly moving said supporting material and said image read-out section with respect to each other, and (f) an erasing section for eliminating the radiation energy remaining on said recording material prior to image recording on said recording material after the radiation image is read out therefrom at said image read-out section, whereby the recording material is efficiently circulated and reused.

In the proposed radiation image recording and read-out apparatus, it is very advantageous that a material comprising an endless supporting belt and a plurality of stimulable phosphor layers overlaid on the endless supporting belt be used as the recording material. In this case, the recording material can be applied around rollers or the like and conveyed and circulated sequentially through the image recording section, the image read-out section and the erasing section. An example of such a configuration is shown in FIG. 5.

With reference to FIG. 5, three stimulable phosphor sheets 102, 102, 102 are fixed on an endless conveyor 101. The conveyor 101 is provided around rollers 103 and 104, and moved in the direction as indicated by the arrow by rotations of the rollers 103 and 104. Around the conveyor 101, an image recording section 110, an image read-out section 120 and an erasing section 130 are disposed sequentially in the direction of conveyance by the conveyor 101.

The image recording section 110 is provided with a radiation source 111 which may be an X-ray source or the like, and stores a radiation image of an object 112 on the stimulable phosphor sheet 102 facing the radiation source 111 via the object 112. The stimulable phosphor sheet 102 carrying the radiation image thus stored thereon is then sent to the image read-out section 120. The image read-out section 120 is provided with a stimulating ray source 121 for emitting stimulating rays 121A such as a laser beam, a light deflector 122 constituted by a galvanometer mirror or the like for deflecting the stimulating rays 121A emitted by the stimulating ray source 121 in the width direction of the conveyor 101, and a photodetector 123 for reading out the light 125 emitted by the stimulable phosphor sheet 102 upon stimulation thereof by the stimulating rays 121A. The photodetector 123 may be constituted by a head-on type photomultiplier, a photoelectric amplification channel plate or the like. The photodetector 123 photoelectrically detects the light 125 emitted by the stimulable phosphor sheet 102 upon stimulation thereof and guided by a light guide member 124. When the image-recorded stimulable phosphor sheet 102 has been sent to the image read-out section 120, the stimulable phosphor sheet 102 is moved normal to the direction of scanning of the stimulating rays 121A, so that the overall surface of the stimulable phosphor sheet 102 is exposed to the stimulating rays 121A and the image read-out is carried out over the overall surface of the stimulable phosphor sheet 102. After the image read-out from the stimulable phosphor sheet 102 is finished, the stimulable phosphor sheet 102 is sent to the erasing section 130 provided with an erasing light source 131. The erasing light source 131 irradiates light having a wavelength within the stimulation wavelength range of the stimulable phosphor sheet 102 onto the stimulable phosphor sheet 102 to cause it to release the radiation energy remaining thereon. The erasing light source 131 may be constituted by, e.g., a tungsten-filament lamp, a halogen lamp, an infrared lamp, or a laser source as disclosed in U.S. Pat. No. 4,400,619. The stimulable phosphor sheet 102 erased at the erasing section 130 is sent again to the image recording section 110. In the course of movement of the stimulable phosphor sheet 102 to the erasing section 130, the stimulable phosphor sheet 102 is cleaned by a cleaning roller 105, and dust is removed from the sheet surface.

However, with the radiation image recording and read-out apparatus as shown in FIG. 5 wherein the overall conveyor 101 is stopped or moved, various problems arise as described below. Specifically, the conveyor 101 must be stopped at the time the image recording is to be carried out at the image recording section 110, and must be moved at the time the image read-out is to be carried out at the image read-out section 120, so that the image recording and the image read-out cannot be carried out at the same time. Therefore, the image recording cannot be carried out as long as the image read-out from the stimulable phosphor sheet 102 is being carried out at the image read-out section 120. A comparatively long time is taken for the image read-out, and therefore the image recording cannot be carried out efficiently in the case where the image recording is to be carried out sequentially for may images. Also, with the radiation image recording and read-out apparatus as shown in FIG. 5, it is not always possible to carry out several image recording steps sequentially and to make wait the image-recorded stimulable phosphor sheets in the region prior to the image read-out section 120. Furthermore, as the conveyor 101 passes over the image read-out section 120 and the erasing section 130 at the same speed, the apparatus cannot satisfy the need that the erasing be carried out substantially by decreasing the speed of conveyance of the stimulable phosphor sheet at the time of the erasing as compared with the image read-out step.

SUMMARY OF THE INVENTION

The primary object of the present invention is to provide a radiation image recording and read-out apparatus wherein a stimulable phosphor layer is provided on an endless belt, and the conditions of conveyance of the endless belt at an image recording section, an image read-out section and other sections are adjustable independently.

Another object of the present invention is to provide a radiation image recording and read-out apparatus wherein processing is carried out substantially and efficiently at an image recording section, an image read-out section and other sections.

The present invention provides a radiation image recording and read-out apparatus comprising:
 (i) an endless belt provided with a stimulable phosphor layer,
 (ii) a conveyance means for conveying and circulating said endless belt applied around said conveyance means,
 (iii) an image recording section provided to face said endless belt for exposing said stimulable phosphor layer to a radiation carrying an image to have the radiation image stored on said stimulable phosphor layer,
 (iv) an image read-out section facing said endless belt and provided with a stimulating ray irradiation means for irradiating stimulating rays to said stimulable phosphor layer carrying said radiation image stored thereon, and a photoelectric read-out means for obtaining electric image signals by reading out light emitted by said stimulable phosphor layer in proportion to the stored radiation energy when said stimulable phosphor layer is exposed to the stimulating rays, and
 (v) an erasing section provided to face said endless belt for eliminating the radiation energy remaining on said stimulable phosphor layer prior to image recording on said stimulable phosphor layer after the radiation image is read out therefrom at said image read-out section, wherein said conveyance means is provided with adjustment sections capable of variably adjusting a length of conveyance of said endless belt, said adjustment sections being provided at least at two positions.

The stimulable phosphor layer may be formed over the overall surface of the endless belt, or only at necessary portions of the surface of the endless belt.

With the radiation image recording and read-out apparatus in accordance with the present invention wherein the adjustment sections are provided, various effects can be achieved in accordance with the positions of the adjustment sections. Specifically, in the case where the two adjustment sections are provided before and after the image recording section respectively, the image recording can be carried out by stopping the conveyance of the endless belt at the image recording section, and the read-out of an image stored on an endless belt portion can be carried out at the image read-out section by shortening the length of conveyance of the endless belt at the adjustment section provided before the image recording section and feeding the endless belt portion to the image read-out section. Also, the endless belt fed out of the image read-out section can be accommodated by increasing the length of conveyance of the endless belt at the adjustment section provided after the image recording section in accordance with the extent of shortening of the length of conveyance of the endless belt at the adjustment section provided before the image. recording section. In this manner, with the radiation image recording and read-out apparatus in accordance with the present invnetion, the image recording and the image read-out can be carried out simultaneously depending on the positions of the adjustment sections. Also, in the case where the adjustment section is provided before the image read-out section, the endless belt portions on which the image recording has been finished can be made to wait at this adjustment section.

Also, in the case where the adjustment sections are provided before and after the erasing section respectively, the speed of conveyance of the endless belt at the erasing section can be made lower than the speed of conveyance of the endless belt at the image read-out section by increasing the length of conveyance at the adjustment section provided before the erasing section as the endless belt is conveyed out of the image read-out section.

As mentioned above, with the radiation image recording and read-out apparatus in accordance with the present invention wherein the conveyance means for the endless belt is provided with at least two adjustment sections for changing the length of conveyance of the endless belt, the conditions of conveyance of the endless belt at the respective sections of the apparatus-can be changed. Therefore, the image recording and the image read-out can be carried out at the same time, or a plurality of the image recording steps can be carried out continuously. Also, the speed of conveyance of the endless belt can be changed between the image read-out and the erasing. Accordingly, with the radiation image recording and read-out apparatus in accordance with the present invention, processing at the respective sections of the apparatus can be carried out substantially and efficiently.

DESCRIPTION OF THE PREFERRED EMBODIMENTS

Figure 1A:
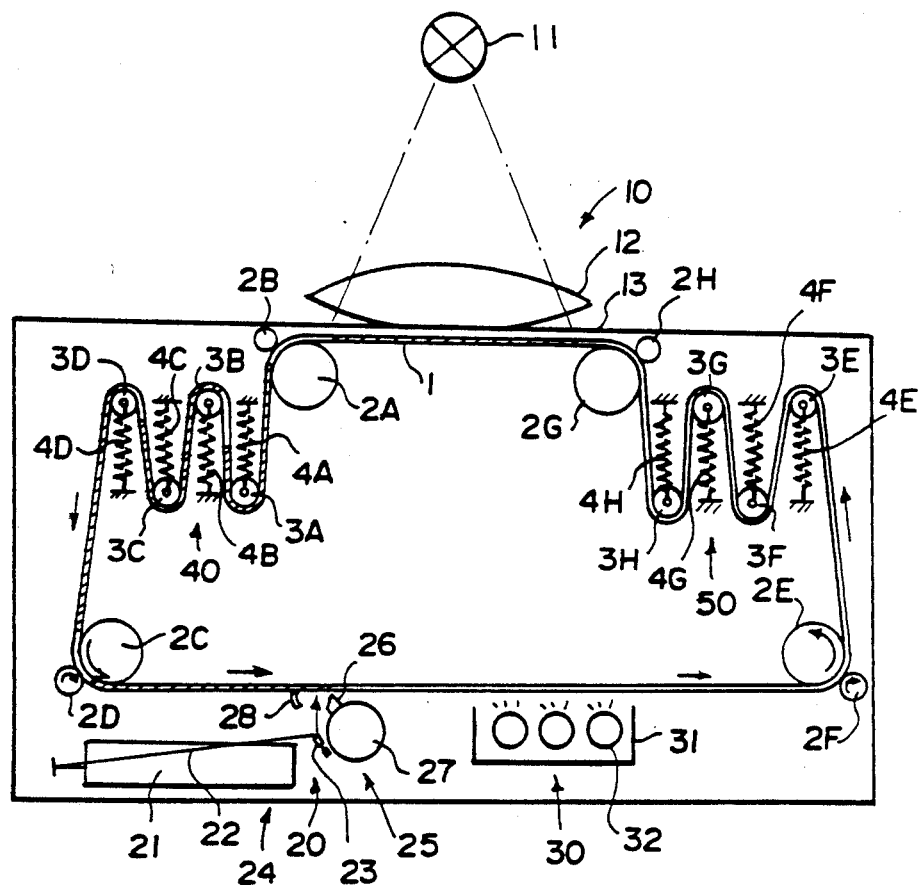
FIGS. 1A, 1B and 1C are side views showing an embodiment of the radiation image recording and read-out apparatus in accordance with the present invention.

The present invention will hereinbelow be described in further detail with reference to the accompanying drawings.

With reference in FIGS. 1A, 1B and 1C, a recording belt 1 composed of an endless belt on which a stimulable phosphor layer is formed over the overall surface is applied around conveying rollers 2A, 2B, 2C, 2D, 2E, 2F, 2G and 2H secured to predetermined positions and around tension rollers 3A, 3B, 3C, 3D, 3E, 3F, 3G and 3H as will be described later, and is conveyed and circulated in the direction as indicated by the arrow. In this embodiment, a conveyance means for the recording belt 1 is constituted by the conveying rollers 2A through 2H and the tension rollers 3A through 3H.

A radiation source 11 constituted by an X-ray source or the like is disposed above the recording belt 1 to face it. The upper region of the apparatus including the radiation source 11 and an image recording table 13 on which an object 12 is to be placed constitutes an image recording section 10. At the image recording section 10, the radiation source 11 is activated to produce a radiation, the radiation passes through the object 12 placed on the image recording table 13, and a radiation image of the object 12 is projected onto the recording belt 1. In this manner, the radiation image of the object 12 is stored on the stimulable phosphor layer of the recording belt 1. A plurality of radiation images can be stored on the recording belt 1, each radiation image is stored on each of the hatched portions of the recording belt 1 shown in FIG. 1. The portion of the recording belt 1 on which the image recording has been finished at the image recording section 10 is conveyed by the conveyance means to an image read-out section 20 provided below the recording belt 1.

Figure 1B:
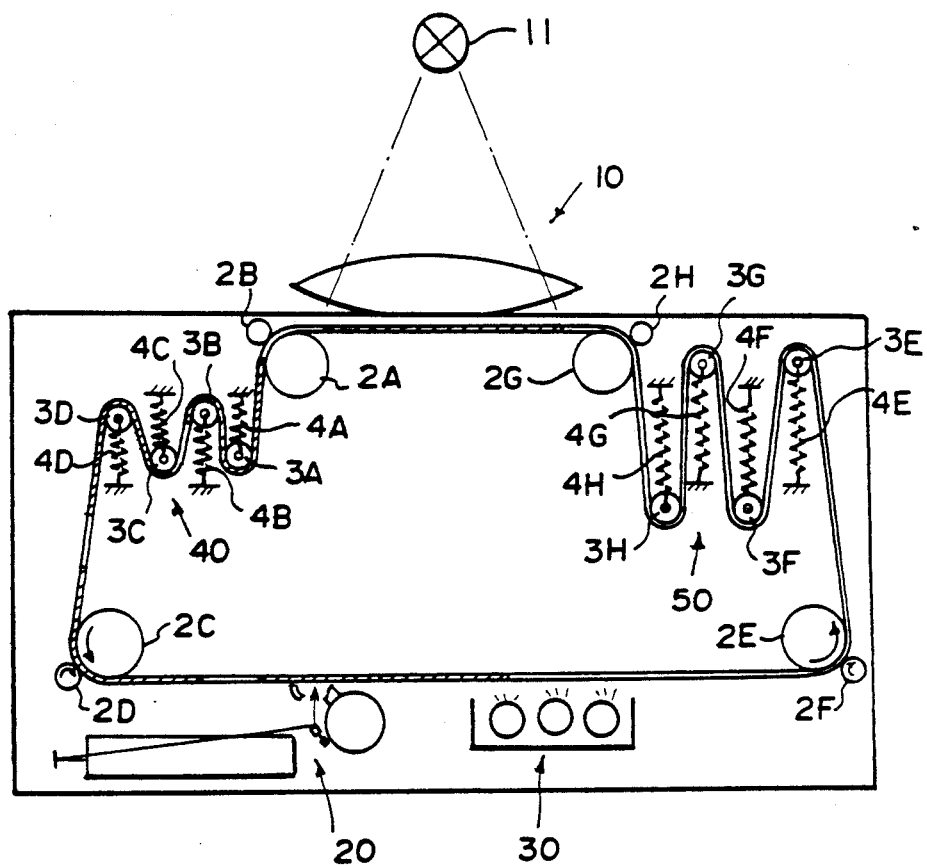
Figure 1C:
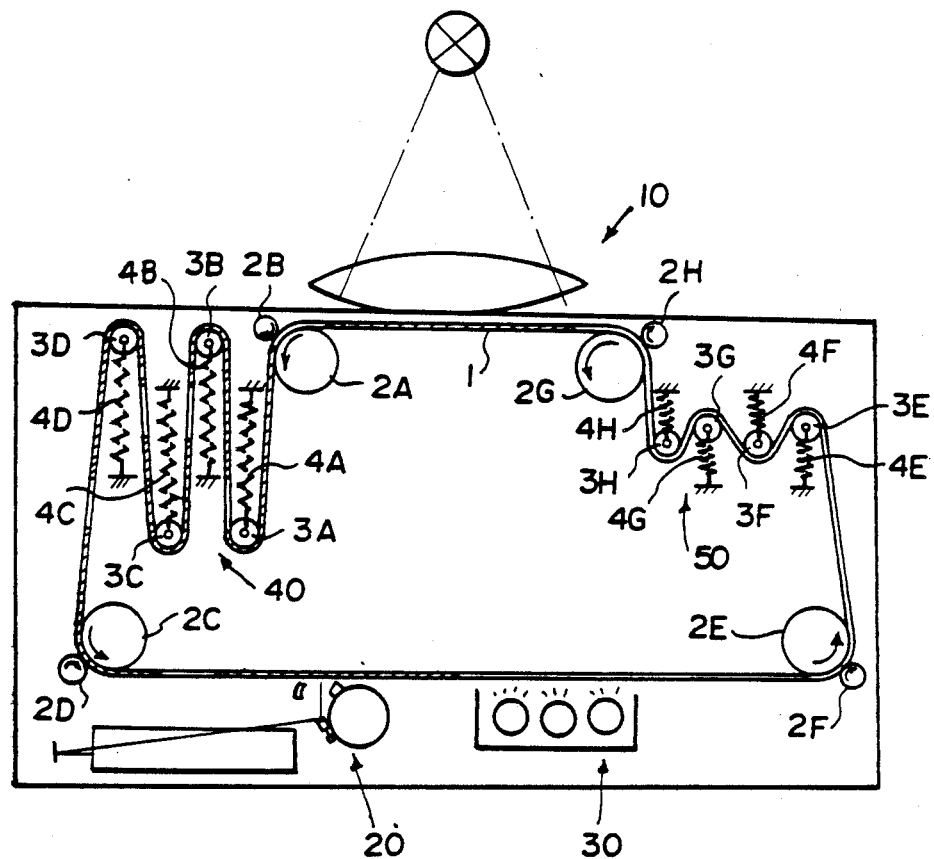

The image read-out section 20 is provided with a stimulating ray irradiation means 24 for deflecting stimulating rays 22, which are produced by a laser beam source 21, by a light deflector 23 which may be a galvanometer mirror, and scanning the stimulating rays 22 in a main scanning direction normal to the drawing sheet in FIG. 1A, and a photoelectric read-out means 25 composed of a light guide member 26 and a photomultiplier 27 for photoelectrically detecting light emitted by the recording belt 1 in proportion to the stored radiation energy when the recording belt 1 is scanned by the stimulating rays 22. The photomultiplier 27 is a long photomultiplier as disclosed in Japanese Unexamined Patent Publication No. 62(1987)-16666 and provided so that a light receiving face of the long photomultiplier extends along the main scanning line at an angle normal to the drawing sheet in FIG. 1A. In FIG. 1A, reference numeral 28 denotes a reflection mirror for reflecting the light, which is emitted by the recording belt 1 in a direction opposite to the photomultiplier 27, toward the light guide member 26. At the image read-out section 20, the recording belt 1 is conveyed by the conveying rollers 2C, 2D, 2E and 2F at a predetermined speed rightwardly in FIG. 1A, i.e. in a sub-scanning direction, and the overall surface of the image-recorded portion of the recording belt 1 is two-dimensionally scanned by the stimulating rays 22 deflected approximately normal to the sub-scanning direction. As the recording belt 1 is scanned by the stimulating rays 22, the scanned portion of the recording belt 1 emits light in proportion to the stored radiation energy. The emitted light is detected by the long photomultiplier 27 via the light guide member 26, and electric image signals based on the emitted light are generated by the long photomultiplier 27.

The portion of the recording belt 1 for which the image read-out has been finished at the image read-out section 20 is conveyed by the conveying rollers 2C, 2D, 2E and 2F to an erasing section 30 provided adjacent to the image read-out section 20. The erasing section 30 comprises a case 31, and a plurality of (by way of example, three) erasing light sources 32, 32, . . . constituted by fluorescent lamps or the like and disposed in the case 31. The erasing light sources 32, 32, . . . mainly produce erasing light having a wavelength within the stimulation wavelength range of the stimulable phosphor layer of the recording belt 1. The erasing light is irradiated to the overall image forming region of the recording belt 1 while the recording belt 1 is being conveyed, thereby to release radiation energy remaining on the stimulable phosphor layer of the recording belt 1 after the image read-out is finished. The recording belt portion on which the erasing has been finished at the erasing section 30 is conveyed by the aforesaid conveying rollers to the image recording section 10 for reuse in image recording.

In this embodiment, a first adjustment section 40 for variably adjusting the length of conveyance of the recording belt 1 is constituted by the tension rollers 3A, 3B, 3C and 3D, and a second adjustment section 50 is constituted by the tension rollers 3E, 3F, 3G and 3H. The first adjustment section 40 and the second adjustment section 50 makes it possible to carry out the image recording and the image read-out simultaneously. Also, a part of the recording belt 1 for which the image recording has been finished can be made to wait before the image read-out section 20. The effects of the first adjustment section 40 and the second adjustment section 50 will be described hereinbelow.

The tension rollers 3A through 3H are urged by springs 4A through 4h respectively in directions that tension the recording belt 1, and are rotatable freely. By way of example, in the case where the image recording at the image recording section 10 and the image read-out at the image read-out section 20 are started simultaneously from the condition shown in FIG. 1A, the first adjustment section 40 adjusts to shorten the length of conveyance of the recording belt 1. Specifically, at the time the image recording is to be carried out at the image recording section 10, the conveying rollers 2A, 2B, 2G and 2H are stopped from rotating, hold the recording belt 1, and secure the belt portion between the conveying rollers 2A and 2B on one hand and the conveying rollers 2G and 2H on the other hand at the image recording position. On the other hand, the conveying rollers 2C, 2D, 2E and 2F are rotated in the directions as indicated by the arrows to move the recording belt 1 in the sub-scanning direction at the image read-out section 20. As shown in FIG. 1B, as the conveying rollers 2A, 2B, 2G and 2H are stopped from rotating and the conveying rollers 2C, 2D, 2E and 2F are rotated, the tension rollers 3A through 3D are gradually moved in directions that contract the springs 4A through 4D against the urging force of the springs 4A through 4D. As a result of the contraction of the springs 4A through 4D by the tension rollers 3A through 3D, the first adjustment section 40 feeds out the recording belt 1 toward the image read-out section 20. Therefore, the image read-out can be carried out at the image read-out section 20 while the image recording is being carried out at the image recording section 10. At this time, the portions of the recording belt 1 passing through the image read-out section 20 and the erasing section 30 are sequentially sent to the second adjustment section 50. As the conveying rollers 2G and 2H are stopped from rotating, the tension rollers 3E through 3H are moved by the urging force of the springs 4E through 4H in directions that increase the length of conveyance of the recording belt 1, and the recording belt 1 fed to the position prior to the image recording section 10 as a result of movement of the recording belt 1 at the image read-out section 20 is acccommodated by the second adjustment section 50.

On the other hand, a comparatively long time is taken for the image read-out at the image read-out section 20, and therefore it would be very efficient if the image recording could be carried out continuously while the read-out of a single image is being carried out at the image read-out section 20. With this embodiment wherein the first adjustment section 40 and the second adjustment section 50 are provided, the image recording can be carried out continuously. Specifically, in the case where the image recording is to be carried out continuously while the image read-out is being carried out, the conveying rollers 2C, 2D, 2E and 2F are rotated at speeds suitable for moving the recording belt 1 in the sub-scanning direction at a predetermined speed at the image read-out section 20, and the conveying rollers 2A, 2B, 2G and 2H are rotated at comparatively high speeds to feed the recording belt 1 by the length of a single-image portion to the image recording position each time a single image recording step is finished. Therefore, as shown in FIG. 1C, at the second adjustment section 50, the springs 4E through 4H are contracted to shorten the length of conveyance of the recording belt 1 by a difference between the rotation speeds of the conveying rollers 2E, 2F and the rotation speeds of the conveying rollers 2G, 2H. Also, at the first adjustment section 40, the tension rollers 3A through 3D are moved by the urging force of the springs 4A through 4D in directions that increase the length of conveyance of the recording belt 1 by a difference between the rotation speeds of the conveying rollers 2A, 2B and the rotation speeds of the conveying rollers 2C, 2D. In this manner, the portions of the recording belt 1 for which the image recording has been finished are sequentially made to wait at the first adjustment section 40, and the image read-out from these portions can be carried out sequentially at the image read-out section 20 after the image read-out from a preceding portion of the recording belt 1 is finished at the image read-out section 20.

As mentioned above, with this embodiment wherein the first adjustment section 40 and the second adjustment section 50 each composed of a group of the tension rollers are provided before and after the image recording section 10 respectively, the image recording and the image read-out can be carried out simultaneously, and it is possible to eliminate the problem that the next image recording cannot be carried out until the image read-out is finished. Also, with this embodiment wherein the first adjustment section 40 is utilized as the waiting zone, a plurality of the image recording steps can be carried out while the read-out of a single image is being carried out, and can thus be carried out efficiently. Furthermore, the waiting zone can be utilized regardless of the size of the recorded image, and the number of the image-recorded portions of the recording belt 1 that can be made to wait at the waiting zone can be increased in the case of the recording of small images.

Figure 2:
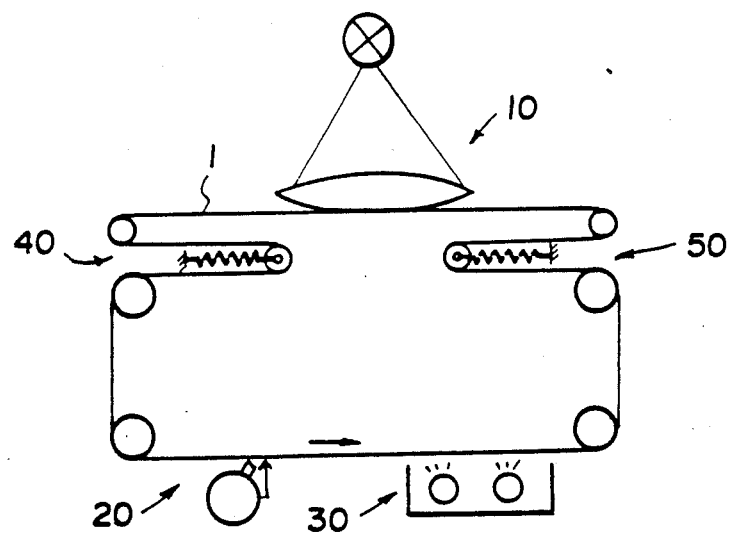
FIGS. 2, 3 and 4 are schematic views showing further embodiments of the radiation image recording and read-out apparatus in accordance with the present invention.
Figure 3:
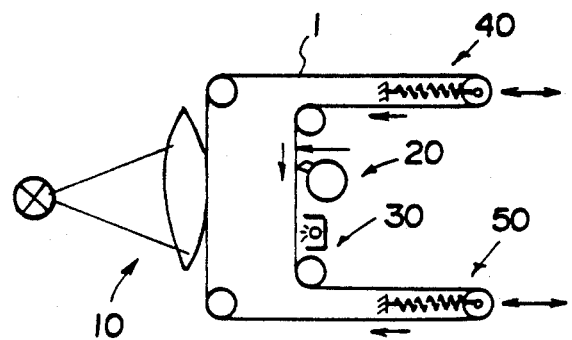

The positions of provision and the configurations of the image recording section 10, the image read-out section 20, the erasing section 30, the first adjustment section 40 and the second adjustment section 50 may be changed in various manners. For example, as shown in FIG. 2, the tension rollers of the first adjustment section 40 and the second adjustment section 50 may be provided for horizontal movement. Also, as shown in FIG. 3, the image recording section 10 may be provided in horizontal relation to the apparatus, and the image read-out section 20 and the erasing section 30 may be provided one above the other.

The adjustment sections in the present invention need not necessarily be provided before and after the image recording section, and may be provided at different positions in accordance with the purposes. For example, as shown in FIG. 4, the adjustment sections may be provided before and after the erasing section 30.

Figure 4:
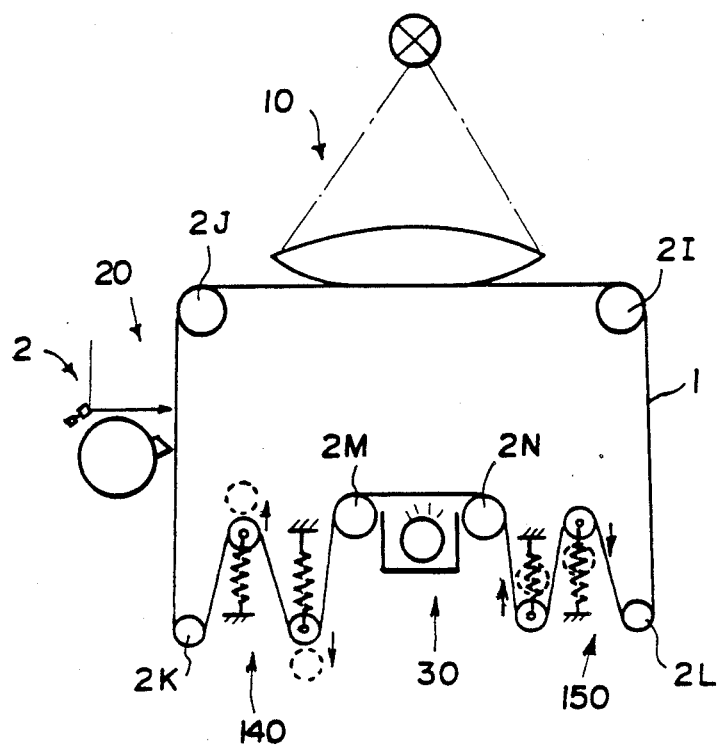

In the embodiment shown in FIG. 4, at the time the image recording is to be carried out at the image recording section 10, the overall recording belt 1 is stopped. After the image recording is finished, conveying rollers 2I, 2J, 2K and 2L are rotated to move the recording belt 1 in the sub-scanning direction at the image read-out section 20. On the other hand, at the erasing section 30, in order to carry out the erasing substantially, it is necessary for the recording belt 1 to be moved at a speed lower than the movement speed at the image read-out section 20. Therefore, conveying rollers 2M and 2N provided before and after the erasing section 30 respectively are rotated at speeds lower than the rotation speeds of the conveying rollers 2I through 2L. In the case where a first adjustment section 140 and a second adjustment section 150 having the same configurations as the first adjustment section 40 and the second adjustment section 50 in the embodiment shown in FIG. 1A are provided before and after the erasing section 30 respectively, even though the movement speed of the recording belt 1 is different between the image read-out section 20 and the erasing section 30, the difference in the movement speed can be accommodated by increasing the length of conveyance at the first adjustment section 140 as indicated by the broken lines in FIG. 4, and shortening the length of conveyance at the second adjustment section 150.

The adjustment sections should preferably be provided at three positions, i.e. between the image recording section 10 and the image read-out section 20, between the image read-out section 20 and the erasing section 30, and between the erasing section 30 and the image recording section 10. In this case, both the effects of the embodiment shown in FIG. 1A and the effects of the embodiment shown in FIG. 4 can be achieved.

Figure 5:
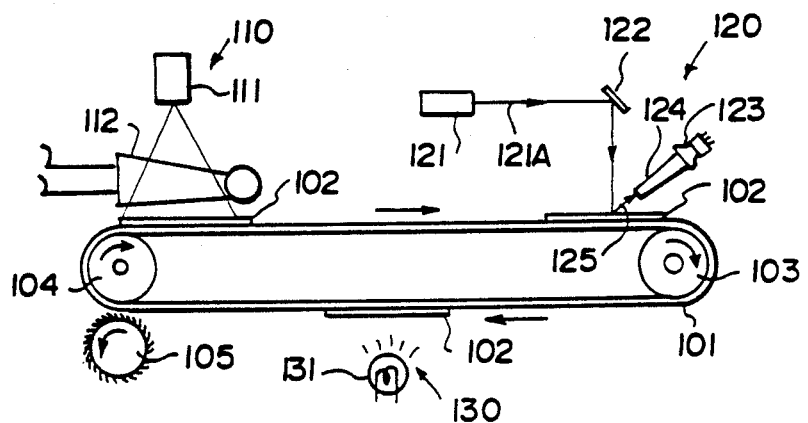
FIG. 5 is a schematic view showing the conventional radiation image recording and read-out apparatus.

In the aforesaid embodiment, each of the adjustment sections is not limited to the type wherein the length of conveyance of the recording belt 1 is adjusted by the tension rollers. For example, rollers at the adjustment sections may be mechanically moved by an independent movement means to adjust the length of conveyance. Also, the stimulable phosphor layer need not necessarily be provided over the overall surface of the recording belt 1, and the stimulable phosphor layer for several images may be provided intermittently at a part of the recording belt 1. Furthermore, the configurations of the image read-out section 20, the erasing section 30 and other sections are not limited to those in the aforesaid embodiments. For example, as the photoelectric read-out means, the means provided with the long photomultiplier as mentioned above should preferably be used for making the apparatus small. However, it is also possible to use the photoelectric read-out means as shown in FIG. 5 comprising a light guide member having a light input end face extending along the main scanning line and a cylindrical light output end face, and a comparatively small photomultiplier closely contacted with the light output end face of the light guide member.

I claim:

1. A radiation image recording and read-out apparatus comprising:
   (i) an endles belt provided with a stimulable phosphor layer,
   (ii) a conveyance means for conveying and circulating said endless belt applied around said conveyance means,
   (iii) an image recording section provided to face said endless belt for exposing said stimulable phosphor layer to a radiation carrying an image to have the radiation image stored on said stimulable phosphor layer,
   (iv) an image read-out section facing said endless belt and provided with a stimulating ray irradiation means for irradiating stimulating rays to said stimulable phosphor layer carrying said radiation image stored thereon, and a photoelectric read-out means for obtaining electric image signals by reading out light emitted by said stimulable phosphor layer in proportion to the stored radiation energy when said stimulable phosphor layer is exposed to the stimulating rays, and
   (v) an erasing section provided to face said endless belt for eliminating the radiation energy remaining on said stimulable phosphor layer prior to image recording on said stimulable phosphor layer after the radiation image is read out therefrom at said image read-out section, wherein said conveyance means is provided with adjustment sections capable of variably adjusting a length of conveyance of said endless belt, said adjustment sections being provided at least at two postions.

2. An apparatus as defined in claim 1 wherein said adjustment sections are provided respectively between said image recording section and said image read-out section, and between said erasing section and said image recording section.

3. An apparatus as defined in claim 1, wherein said adjustment section comprises means for adjusting relative proportions of a total length of said endless belt extending between said at least two positions in a conveyance direction along said belt.

4. An apparatus as defined in claim 1, wherein said adjustment sections comprise tension rollers mounted on springs.

* * * * *